(12) United States Patent
Andersen et al.

(10) Patent No.: US 7,898,100 B2
(45) Date of Patent: Mar. 1, 2011

(54) METHOD OF OPERATING A WIND TURBINE WITH PITCH CONTROL, A WIND TURBINE AND A CLUSTER OF WIND TURBINE

(75) Inventors: Brian W. Andersen, Ringkobing (DK); Erik Carl Miranda, Randers (DK); Rasmus Svendsen, Randers (DK); John Thomas Olesen, Hadsten (DK); Ole Sonderby, Hinnerup (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/603,311

(22) Filed: Oct. 21, 2009

(65) Prior Publication Data
US 2010/0038909 A1    Feb. 18, 2010

Related U.S. Application Data

(63) Continuation of application No. PCT/DK2008/000166, filed on Apr. 30, 2008.

(30) Foreign Application Priority Data

Apr. 30, 2007    (DK) ................................ 2007 00651

(51) Int. Cl.
*H02P 9/00* (2006.01)
*F03D 9/00* (2006.01)
(52) U.S. Cl. .............................. 290/44; 290/43; 322/37
(58) Field of Classification Search ................... 290/43, 290/44, 54, 55; 322/37
See application file for complete search history.

(56) References Cited

U.S. PATENT DOCUMENTS 4,565,929 A * 1/1986 Baskin et al. ................. 290/44
5,907,192 A * 5/1999 Lyons et al. ................... 290/44
7,121,795 B2 * 10/2006 Moroz et al. .................. 416/1
7,175,389 B2 * 2/2007 Moroz ........................... 416/1

(Continued)

FOREIGN PATENT DOCUMENTS

EP    0847496 B1    8/2000

(Continued)

OTHER PUBLICATIONS

Park J W, et al: "Control of active power in a doubly-fed induction generator taking into account the rotor side apparent power" Power Electronics Specialists Conference, 2004. PESC 04. 2004 IEEE 351 H Annual Aachen, Germany Jun. 20-25, 2004, Piscataway, NJ, USA, IEEE, US, vol. 3, Jun. 20, 2004, pp. 2060-2064, XP010739588 ISBN: 978-0-7803-8399-9 the whole document.

(Continued)

*Primary Examiner*—Nicholas Ponomarenko
(74) *Attorney, Agent, or Firm*—St. Onge Steward Johnston & Reens LLC (57) ABSTRACT

A method of operating a pitch controlled wind turbine connected to the utility grid in response to an increase in wind velocity to above a predefined value. The method includes the sequential steps of: reducing the generated power, allowing an intermediate increase in the generator speed, and reducing the generator speed by pitching the wind turbine rotor blades. A wind turbine and a cluster of wind turbines is also contemplated.

19 Claims, 6 Drawing Sheets

U.S. PATENT DOCUMENTS

| | | | |
|---|---|---|---|
| 7,342,323 B2 * | 3/2008 | Avagliano et al. | 290/55 |
| 7,355,294 B2 * | 4/2008 | Teichmann | 290/44 |
| 7,425,771 B2 * | 9/2008 | Rivas et al. | 290/44 |
| 7,488,155 B2 * | 2/2009 | Barbu et al. | 416/1 |
| 7,663,260 B2 * | 2/2010 | Kabatzke et al. | 290/44 |
| 7,679,208 B1 * | 3/2010 | Ko et al. | 290/44 |
| 7,690,895 B2 * | 4/2010 | Moroz | 416/132 B |
| 7,745,948 B2 * | 6/2010 | Kerber | 290/44 |
| 2007/0057517 A1 | 3/2007 | McNerney | |

FOREIGN PATENT DOCUMENTS

| | | | |
|---|---|---|---|
| WO | 9842980 A1 | 10/1998 |
| WO | 0133075 A1 | 5/2001 |
| WO | 2004011799 A1 | 2/2004 |
| WO | 2005090781 A1 | 9/2005 |

OTHER PUBLICATIONS

International Search Report and Written Opinion of the International Searching Authority; PCT/DK2008/000166; Feb. 11, 2009; 16 pages.

Tapia A et al: "Modeling and dynamic regulation of a wind farm" Power Electronics Congress, 2000. CIEP 2000. VII IEEE International Oct. 15-19, 2000, Piscataway, NJ, USA,IEEE, Oct. 15, 2000, pp. 293-297, XP010527924 ISBN: 978-0-7803-6489-9.

* cited by examiner

METHOD OF OPERATING A WIND TURBINE WITH PITCH CONTROL, A WIND TURBINE AND A CLUSTER OF WIND TURBINE

CROSS-REFERENCE TO RELATED APPLICATIONS

The present application is a continuation of pending International patent application PCT/DK2008/000166 filed on Apr. 30, 2008 which designates the United States and claims priority from Danish patent application PA 2007 00651 filed on Apr. 30, 2007, the content of which is incorporated herein by reference.

FIELD OF THE INVENTION

The invention relates to a method of operating a wind turbine with pitch control. The invention relates also to a wind turbine and cluster of wind turbines.

BACKGROUND OF THE INVENTION

Hard weather conditions such as high wind speeds, have high impact on exposed wind turbines causing major loads on its components due to the excessive aero dynamical power of the wind acting on the wind turbine rotor.

Various methods of prior art have been used to cut-off the wind turbine from the grid e.g. at a predefined stop wind speed or to reduce the power and/or the rotational speed of the rotor proportional to an increase in wind speed above a predefined "roll off" wind speed.

EP 0847496 discloses a wind turbine control method implying that the power of the wind turbine as well as the rotor speed of a gear-less wind turbine is reduced continuously above and in dependence of a critical wind speed in order to avail the wind turbine to operate at an extended wind velocity range.

A problem related to this technique is that within the extended wind velocity range loads on wind turbine components such as the gear may be drastically increased. Furthermore for wind situations comprising high fluctuations in wind energy at the relevant high wind velocity may both appear very sudden and involve extreme sudden variations in the rotational speed of the wind turbine.

Fluctuations in wind energy may be less critical when applying the method in gear-less wind turbines while application in connection with a wind turbine including a gear is highly problematic as a continuous reduction of wind turbine rotor speed in relation to increasing wind velocity may require that the control is extremely fast as the possible fluctuations in energy increases critically while exceeding a certain point, e.g. 25 m/s.

It is an object of the present invention to provide an advantageous method of operating a wind turbine during high wind conditions without the above mentioned disadvantages.

SUMMARY OF THE INVENTION

The present invention relates to a method of operating a pitch controlled wind turbine connected to the utility grid in response to an increase in wind velocity to above a predefined value, said method comprising the sequential steps of:
reducing the generated power,
allowing an intermediate increase in the generator speed, and
reducing the generator speed by a means of pitching the wind turbine rotor blades.

By controlling a wind turbine connected to the utility grid at high wind velocities according to the method of the invention, it is ensured that the wind turbine can stay connected to the utility grid during said high winds and still is able to supply electrical power to the utility grid.

As the wind velocity increases it may be necessary to decrease the loads in wind turbine components such as the torque in the gear and by applying said sequential steps this is ensured.

By allowing an intermediate increase in generator speed, it is furthermore ensured that a sudden change/increase in said loads on wind turbine components such as the torque in the gear due to the reduction in generated power can be minimized or avoided as the excessive aero dynamical force in the wind is transferred to rotational speed whereby the torque can be kept substantially constant.

Furthermore it is ensured that coincidence between 1 P or 3 P of the rotor frequency and the eigen-frequency of the wind turbine tower can be avoided.

Even further it is ensured that pitching the wind turbine rotor out of the wind can be established by a rate that is safe for both the pitching means such as pitch actuators and for other wind turbine components such as gear, converter, rotor blades, tower etc.

It is also an advantage by the present invention that the slip value can be kept constant whereby synchronous rotation of the generator can be avoided.

In another aspect of the invention the pitching is controlled using a time constant which is higher than the time constant by means of which the generator/generated power is reduced. Hereby it is ensured that the speed of the pitching means can be lower than the speed of power controller means whereby it is further ensured that loads on e.g. pitch actuators (and rotor blades) is minimized.

In yet another aspect of the invention said wind velocity is a value determined on the basis of an average of actual wind velocity measurements. By operating the wind turbine on the basis of an average of actual wind velocity measurements it is ensured that a stable control of the wind turbine is established and that set points for wind turbine controllers are not constantly altered with a high frequency relating to the high frequent fluctuating wind velocities. It is furthermore ensured that for e.g. winds at high wind situations with a high fluctuating or turbulence component, the loads on wind turbine components due to an aggressive control strategy is minimized.

In another aspect of the invention said reducing generated power is established by lowering one or more set points for a generator power controller. The term set points is to be regarded as reference input values for said controller. Hereby it is ensured that supplied power can be proportional with a desired nominal generated power value. It is furthermore ensured that the wind turbine can be controlled after control strategies defined by an operator external to the wind turbine such as a grid operator. This in turn ensures that said operator can define his/her control strategy e.g. on the basis of life time considerations vs. marked price of supplied power hereby operating the wind turbine with more or less loads on components of the wind turbine.

In another aspect of the invention said generated power is reduced in one or more steps. Hereby it is ensured that a simple control strategy is established comprising fixed set points for wind turbine controllers. Furthermore it is an advantage that the operation of the wind turbine can easily be verified.

In another aspect of the invention the number of said one or more steps is in the range of 1 to 10, preferable in the range 2 to 5 such as 3. Hereby it is ensured that for each step a sufficient reduction in generated power is made as to ensure reduction of loads on the wind turbine components.

In a further aspect of the invention the levels of said steps are defined in relation to the fluctuation in the wind. It is hereby ensured that the invented method can adapt to actual environmental conditions at the actual time of operation. Furthermore the level of loads on wind turbine components can be controlled as not to reach fatigue levels even at high wind situations with high fluctuation in the wind. As an explanatory example of a 2 MW wind turbine operating in environmental conditions comprising high levels of fluctuation in the wind, a first step of reducing the generated power can be a reduction to 1 MW. For a similar wind turbine operated in conditions comprising low levels of fluctuations in the wind, a first step of reducing the generated power can be a reduction to 1.75 MW.

In an even further aspect of the invention said allowing an increase in the generator speed is limited to generator speeds below 1900 rpm. It is hereby ensured that the generator speed does not reach one of said limit(s) whereby the wind turbine may trip offline contrary to what is desired for the operation even at high wind situations. Furthermore it is ensured that the speed is operated at values in a range where no damages on the rotor, gear and generator is expected to occur.

In another aspect of the invention said reducing generator speed is established by lowering one or more set points for a generator speed controller. Hereby it is ensured that generator speed can be proportional with a desired nominal generator speed. It is furthermore ensured that the torque in the gear and generator can be controlled as to be below fatigue limits for said components. This in turn ensures that said operator can define his/her control strategy e.g. on the basis of life considerations and tear/wear on wind turbine components vs. marked price of supplied power hereby operating the wind turbine with more or less loads on components of the wind turbine.

Further in another aspect of the invention said generator speed is reduced in one or more steps. Hereby it is ensured that a simple control strategy is established comprising fixed set points for wind turbine controllers. Furthermore it is an advantage that the operation op the wind turbine can easily be verified.

In another aspect of the invention said generator speed is reduced in relation to the fluctuation in the wind. It is hereby ensured that the invented method can adapt to actual environmental conditions at the actual time of operation. Furthermore the level of loads on wind turbine components can be controlled as not to reach fatigue levels even at high wind situations with high fluctuation in the wind. As an example, for a wind turbine operating in conditions comprising low levels of fluctuations in the wind, a first step of reducing the generator speed can be a reduction by e.g. 5% of nominal rotational speed. For a wind turbine operating in conditions comprising high levels of fluctuations in the wind, a first step of reducing the generator speed can be a reduction by e.g. 20% of nominal rotational speed.

In a further aspect of the invention said predefined wind velocity value is dependent on the fluctuation in the wind. Hereby it is ensured that a more safe control mode or strategy can be established earlier for the wind turbine at sites or at wind situations with a high component of fluctuation in the wind as said fluctuations highly contribute to fatigue loads and decreased lifetime for wind turbine components.

In another aspect of the invention said predefined wind velocity value is defined dependent on forecasts of the wind. Hereby it is ensured that a suitable control mode and control parameters of the wind turbine can be established and adapted to coming weather situations which in turn ensures that loads on wind turbine may be minimized. As an explanatory example, if weather forecasts predict an upcoming high wind situation comprising e.g. high levels of fluctuation, said predefined wind velocity value can be established at a relative low value, before the storm reaches the wind turbine.

In another aspect of the invention the wind turbine is closed down when said generator speed is reduced to below a predefined close-down value. Hereby it is ensured that the generator is operating in a speed range suitable for the generator such as above its lower speed limit.

In yet another aspect of the invention said predefined close-down value is in the slip-range of the wind turbine.

The invention also relates to a wind turbine for performing the method as described above.

In one aspect of the invention said wind turbine is a double fed induction generator (DFIG) wind turbine. Hereby it is ensured that wind turbines comprising a gear can take advantage of the invention and can be operated at high wind situations without extreme high torque on said gear.

Furthermore the invention relates to a cluster of wind turbines comprising two or more wind turbines as described above and for one aspect of the invention the wind velocity is measured centrally.

BRIEF DESCRIPTION OF THE DRAWINGS

The invention will be described in the following with reference to the figures in which.

DETAILED DESCRIPTION OF THE INVENTION

Figure 1:
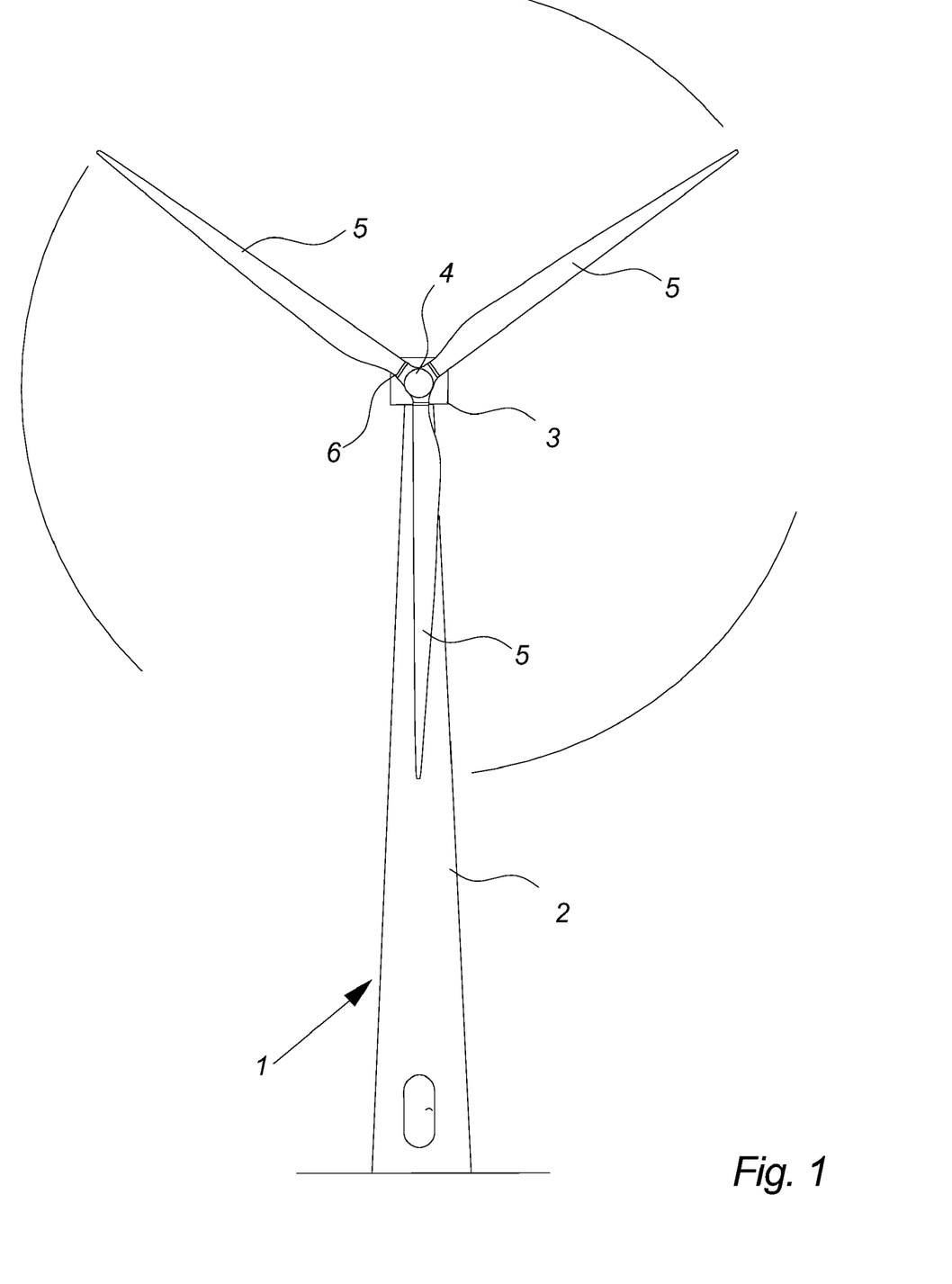
FIG. 1 illustrates a large modern wind turbine as seen from the front.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 6. Each pitch mechanism includes a blade bearing and individual pitch actuating means which allows the blade to pitch. The pitch process is controlled by a wind turbine controller comprising a pitch controller.

As indicated on the figure, wind over a certain level will activate the rotor and allow it to rotate in a substantially perpendicular direction to the wind. The rotation movement is converted to electric power which usually is supplied to the utility grid as will be known by skilled persons within the area.

Figure 2:
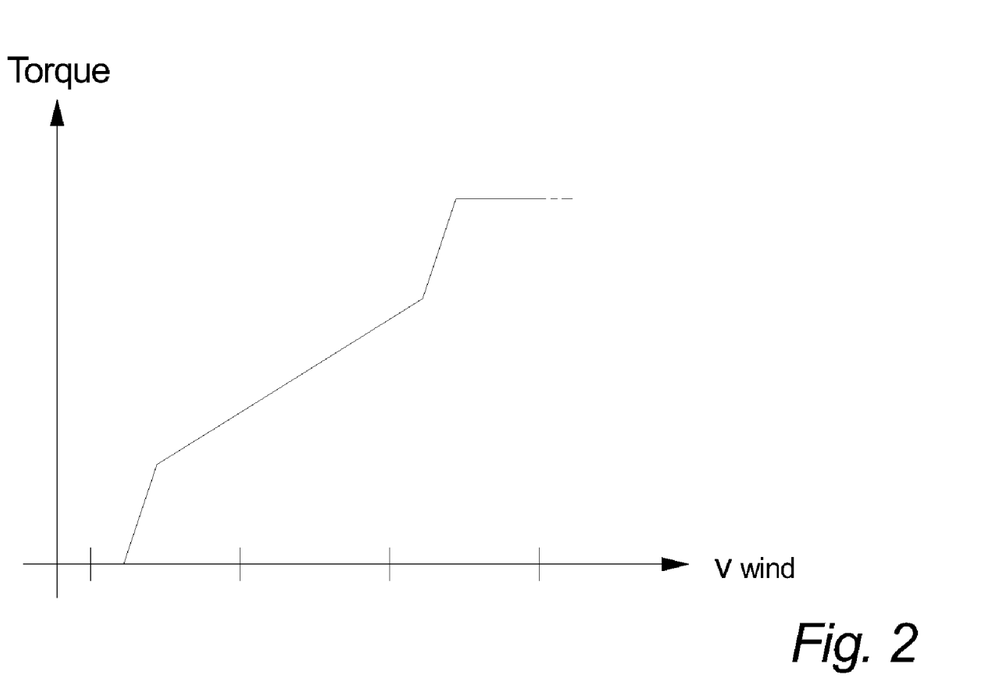
FIG. 2 illustrates schematically for one embodiment of a wind turbine, the relation between wind velocity and torque.

FIG. 2 illustrates schematically for one embodiment of a wind turbine, a typical relation between wind velocity and torque e.g. in the drive train of a wind turbine. As can be seen the torque increases for increasing wind velocities.

Figure 3A:
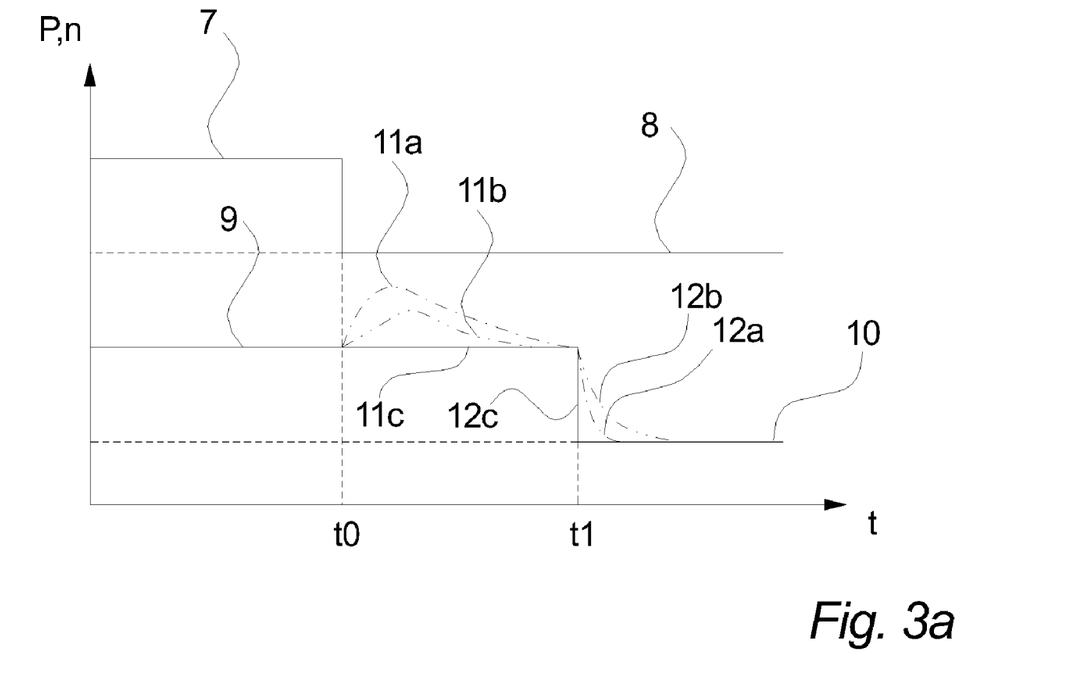
FIG. 3a illustrates schematically generated power P and generator speed n according to various embodiments of the invention.
Figure 3B:
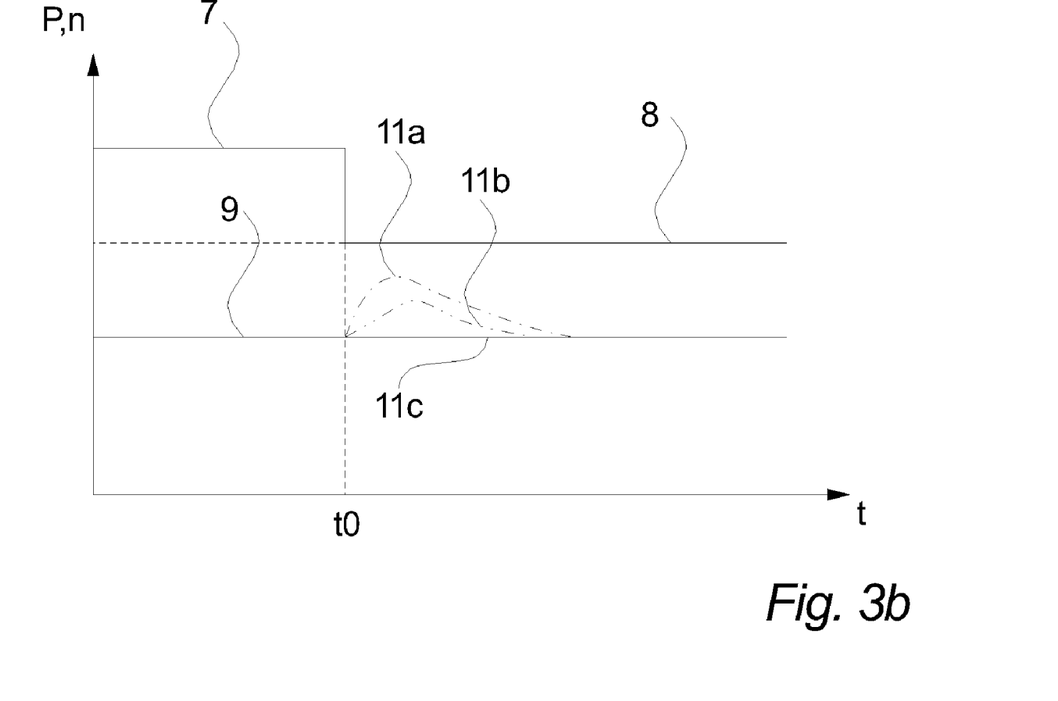
FIG. 3b illustrates schematically generated power P and generator speed n according to other embodiments of the invention.

The FIGS. 3a and 3b illustrates schematically various embodiments of the invention.

At high wind situations the components of a wind turbine are exposed to excessive loads and increasing wind velocity or sudden wind gusts may have high impact on said loads and the loads may increase to levels near or above their extreme and fatigue limits. At such situations it is therefore desired to control the wind turbine with parameters that can minimize the risk of reaching e.g. the fatigue limits.

As there is a proportional relation between torque in the generator and power or generator speed respectively, it may for some situations be desired to reduce the power and/or generator speed.

As an example of one embodiment of the invention, at a given wind situation a wind turbine is operated at nominal power 7 and generator speed 9 parameters as illustrated schematically in FIG. 3a. At time to it may be required to reduce the generated power to a lower level 8 e.g. as a result of increasing wind velocity and a desired reduction in wind generated loads on wind turbine components such as rotor blades, pitch bearings, gear, generator, tower etc.

For the embodiments illustrated in FIG. 3a the reduction in generated power is schematically illustrated as step down but the reduction may for other embodiments follow various continuous or non-continuous paths.

According to various embodiments of the present invention, said power reduction controlled by a wind turbine power controller allows an intermediate increase in the generator speed 11a, 11b as indicated on the figure. The level to which the generator speed increases 11a, 11b may depend on various parameters such as energy of fluctuations of the wind. According to various embodiments of the invention, the generator speed is not allowed to increase as to reach safety limits of the rotor, generator or wind turbine.

For one embodiment of the invention, the generator speed does not increase but remain at its previous level 11c.

According to the invention the reduction in power is sequential followed by a reduction in generator speed as illustrated at $t_1$ to a new lower level 10. The slope at which the generator speed is reduced 12a, 12b, 12c can for various embodiments be controlled by a wind turbine generator speed controller on the basis of specific parameters of the wind turbine and wind turbine components such as torque in generator and/or gear, loads on the rotor blades etc. and/or environmental parameters such as wind velocity, fluctuation in the wind etc.

FIG. 3b illustrates one embodiment of the invention where no reduction of generator speed is following a reduction in generated power. Still though an intermediate increase in generator speed is allowed 11a, 11b or the generator speed remain at its previous level 11c.

Figure 4A:
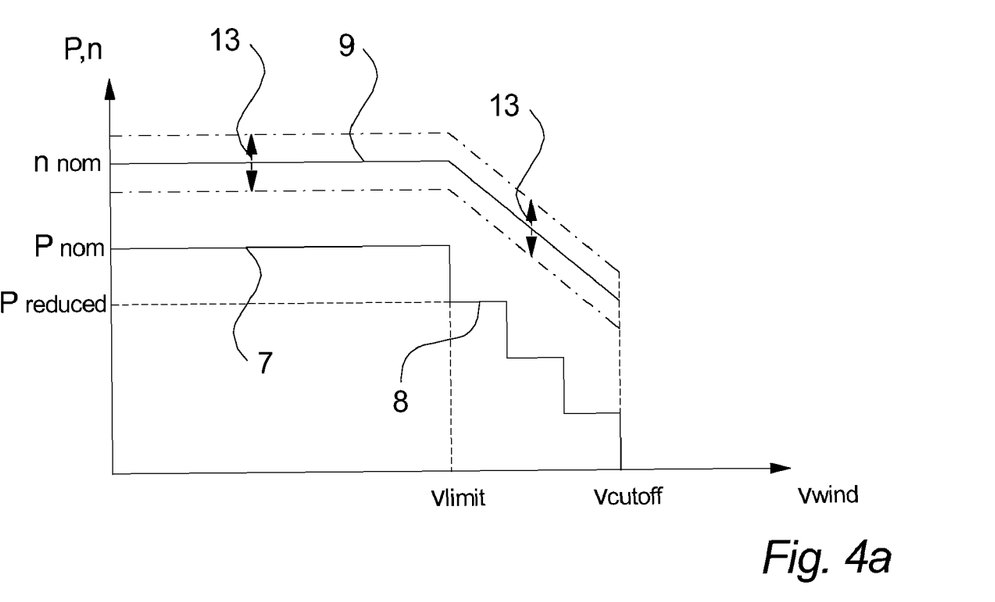
FIG. 4a illustrates schematically constant tolerance bands related to generator speed n according to various embodiments of the invention.

FIG. 4a illustrates for various embodiments of the invention a control scheme for situations where the wind velocity $v_{wind}$ rises to above a predefined value $v_{limit}$. For wind velocities below $v_{limit}$ the wind turbine is operating at nominal power output $P_{nom}$ and nominal generator speed $n_{nom}$.

As the wind velocity reaches $v_{limit}$ the power as well as the generator speed is reduced at a further increase in wind velocity according to the invention. As depicted in FIG. 4a the power level can be reduced in steps contrary to the generator speed that is reduced following some continuous curve.

As the immediate rotational speed of the rotor, and hereby the generator speed is highly influenced by fluctuations in the wind, for some embodiments it is tolerated that the generator speed varies accordingly within a tolerance band 13.

This in fact means that for some embodiments of the invention the generator speed may even increase even though the power has been reduced but as an average the generator speed is reduced.

The range of said tolerance band 13 may for different embodiments be controlled dependent on various measured parameters of the wind turbine such as torque in gear, torque in generator, loads on rotor blades, deflection of rotor blades and/or environmental parameters such as wind velocity, fluctuation in the wind etc.

FIG. 4a illustrates embodiments where the tolerance band 13 is of a constant range independent of the wind velocity.

Figure 4B:
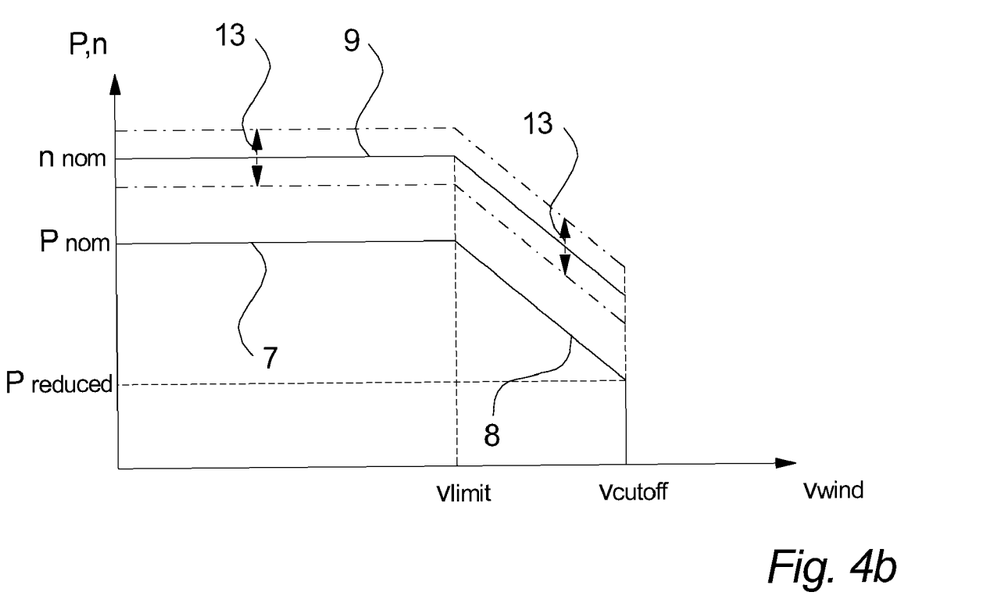
FIG. 4b illustrates schematically constant tolerance bands related to generator speed n according to other embodiments of the invention.

FIG. 4b illustrates for other embodiments of the invention, a control scheme for situations where the wind velocity $v_{wind}$ rises to above a predefined value $v_{limit}$. For wind velocities below $v_{limit}$ the wind turbine is operating at nominal power output $P_{nom}$ and nominal generator speed $n_{nom}$.

As the wind velocity reaches $v_{limit}$ the power as well as the generator speed is reduced at a further increase in wind velocity according to the invention. As depicted in FIG. 4b the power level as well as the generator speed can be reduced in accordance with a continuous function of the wind velocity.

Furthermore FIG. 4b illustrates embodiments where the tolerance band 13 is of a constant range independent of the wind velocity.

Figure 4C:
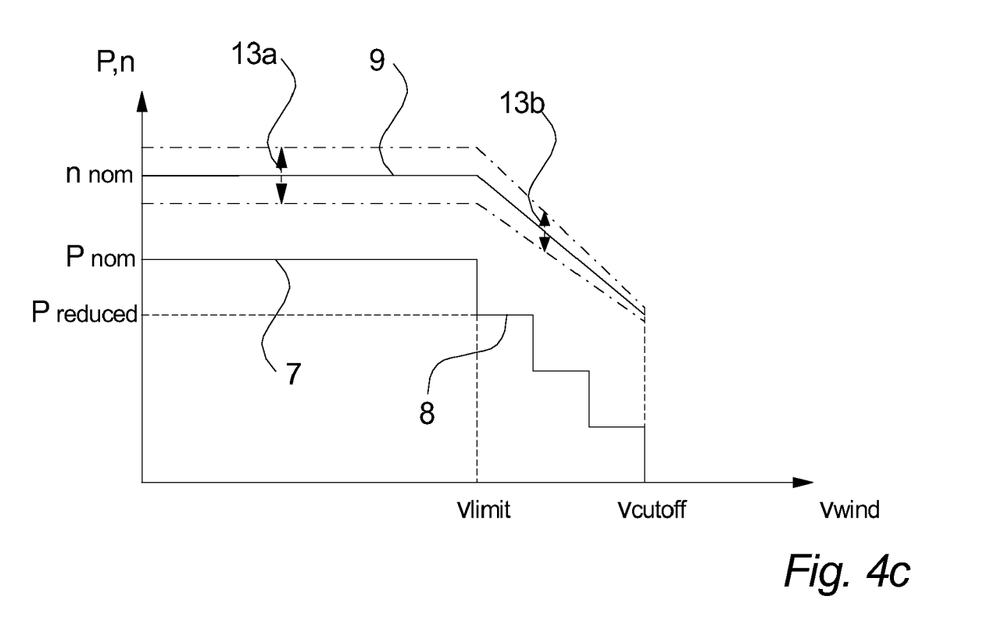
FIG. 4c illustrates schematically non-tolerance bands related to generator speed n according to various embodiments of the invention.

FIG. 4c illustrates for even further embodiments an increase of the range of the tolerance band 13 for increasing wind velocities as to ensure that e.g. sudden large wind fluctuations at high wind velocities does not generate large changes in loads on wind turbine components that reaches the extreme loads of the wind turbine components.

Figure 4D:
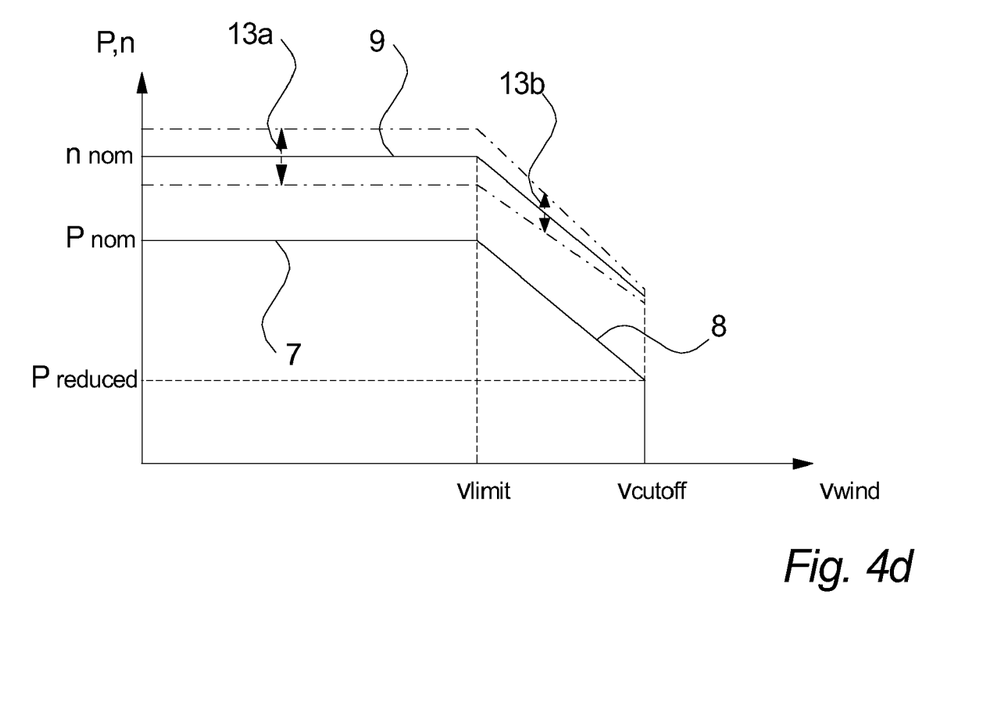
FIG. 4d illustrates schematically non-tolerance bands related to generator speed n according to other embodiments of the invention.

Furthermore said reduction in tolerance band range proportional with increasing wind velocity can be applied for both control schemes comprising a step-wise, FIG. 4c, or continuous, FIG. 4d, reduction in generated power as described previously under FIG. 4c and 4d.

Figure 5:
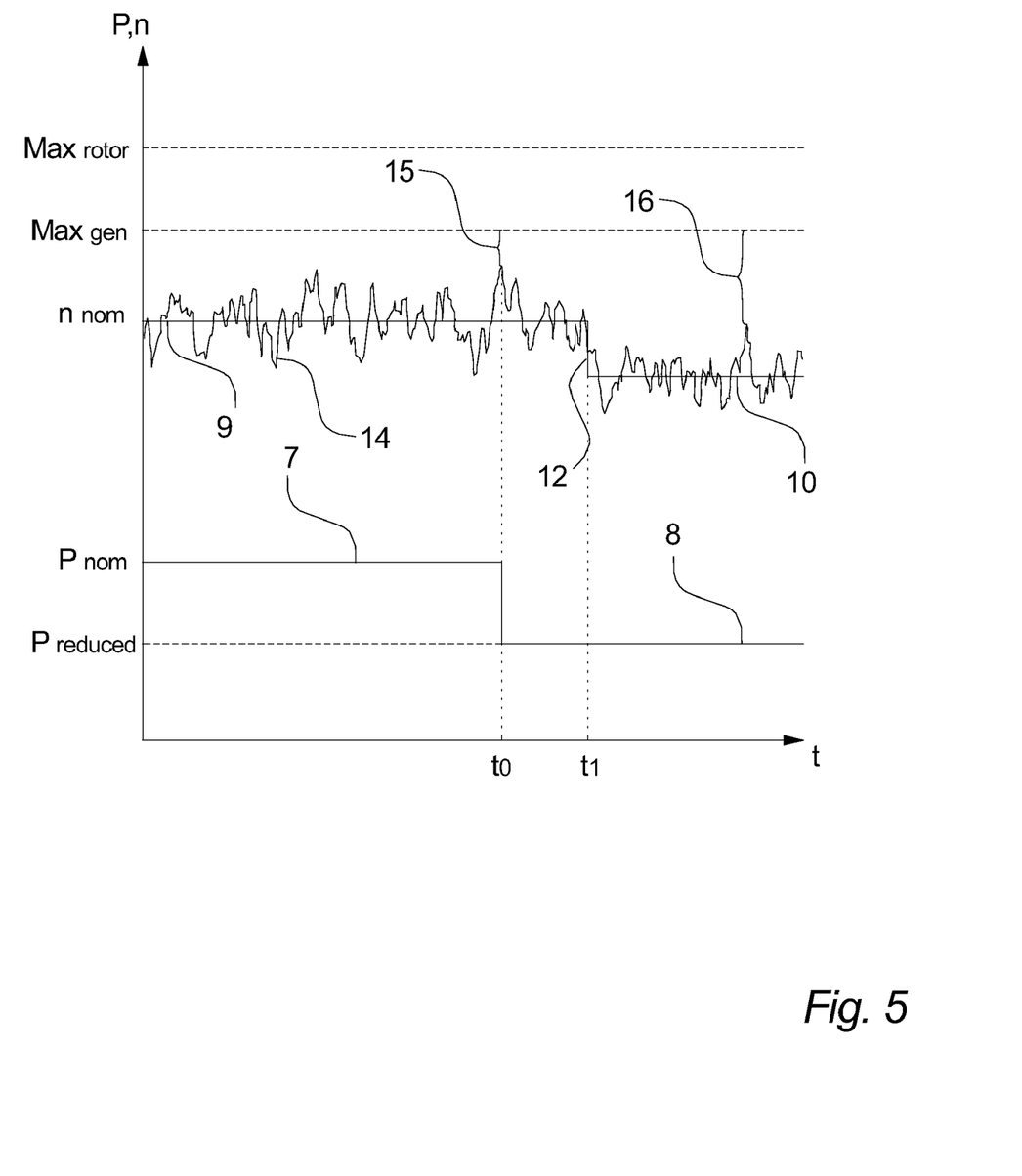
FIG. 5 illustrates schematically initialization of the invented method triggered by the operational speed of the generator.

FIG. 5 illustrates for even further embodiments of the invention a control scheme for situations where the wind velocity $v_{wind}$ rises to above a predefined value $v_{limit}$. For wind velocities below $v_{limit}$ the wind turbine is operating at nominal power output $P_{nom}$ and nominal generator speed $n_{nom}$.

For these embodiments the value of $v_{limit}$ is defined by monitoring the fluctuations of generator speed which in turn is an indicator of the level of fluctuations in the wind.

By small fluctuations of generator speed 14 the wind turbine can supply nominal power 7 to the utility grid. Furthermore the generator is operated at nominal rotational speed 9.

As both generator and rotor have limitations regarding their rotational speeds, it is of high importance that these limits should not be exceeded. The values at which said limits are established may vary dependent on the actual operational situation of the wind turbine. For the embodiment depicted in FIG. 5 the lower limitation is in the generator speed, but it may as well for other embodiments at other operational conditions be in the rotor speed.

By continuously to monitor how close the actual rotational speed of the generator 14 is to said limits, it is possible to establish a control value. If e.g. due to increasing wind velocities said value decreases to below a predefined level 15 illustrated at time=t0 in the figure, the wind turbine controller reduces the power according to the invention. By the sequential following reduction in generator speed illustrated at time=t1 in the figure the distance between actual rotational speed and the limits will be extended and the wind turbine is hereby operated in a more safe mode and is not as sensitive to fluctuations in the wind.

What is claimed is:

1. A method of operating a pitch controlled wind turbine connected to a utility grid in response to an increase in wind velocity to above a predefined value, said method comprising the sequential steps of:
   reducing the generated power,
   allowing an intermediate increase in a generator speed, and
   reducing the generator speed by a means of pitching the wind turbine rotor blades.

2. The method of operating a pitch controlled wind turbine according to claim 1, wherein the pitching is controlled using a time constant which is higher than the time constant by means of which the generator/generated power is reduced.

3. The method of operating a pitch controlled wind turbine according to claim 1, wherein said wind velocity is a value determined on the basis of an average of actual wind velocity measurements.

4. The method of operating a pitch controlled wind turbine according to claim 1, wherein said reducing generated power is established by lowering one or more set points for a generator power controller.

5. The method of operating a pitch controlled wind turbine according to claim 1, wherein said generated power is reduced in one or more steps.

6. The method of operating a pitch controlled wind turbine according to claim 5, wherein a number of said one or more steps is in the range of 1 to 10.

7. The method of operating a pitch controlled wind turbine according to claim 5, wherein levels of said steps are defined in relation to fluctuation in the wind.

8. The method of operating a pitch controlled wind turbine according to claim 1, wherein said allowing an increase in the generator speed is limited to generator speeds below 1900 rpm.

9. The method of operating a pitch controlled wind turbine according to claim 1, wherein said reducing generator speed is established by lowering one or more set points for a generator speed controller.

10. The method of operating a pitch controlled wind turbine according to claim 1, wherein said generator speed is reduced in one or more steps.

11. The method of operating a pitch controlled wind turbine according to claim 1, wherein said generator speed is reduced in relation to fluctuation in the wind.

12. The method of operating a pitch controlled wind turbine according to claim 1, wherein said predefined wind velocity value is dependent on fluctuation in the wind.

13. The method of operating a pitch controlled wind turbine according to claim 1, wherein said predefined wind velocity value is defined dependent on forecasts of the wind.

14. The method of operating a pitch controlled wind turbine according to claim 1, wherein operation of the wind turbine is closed down when said generator speed is reduced to below a predefined close-down value.

15. The method of operating a pitch controlled wind turbine according to claim 14, wherein said predefined close-down value is in a slip-range of the wind turbine.

16. A pitch controlled wind turbine for performing the method as claimed in claim 1.

17. The wind turbine according to claim 16, wherein said wind turbine is a doubled fed induction generator (DFIG) wind turbine.

18. A cluster of wind turbines comprising two or more wind turbines as claimed in claim 16.

19. The cluster of wind turbines according to claim 18 wherein wind velocity is measured centrally.

* * * * *